(12) United States Patent  
Wang

(10) Patent No.: US 8,781,841 B1  
(45) Date of Patent: Jul. 15, 2014

(54) NAME RECOGNITION OF VIRTUAL MEETING PARTICIPANTS

(75) Inventor: Zhuang Wang, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 485 days.

(21) Appl. No.: 13/155,250

(22) Filed: Jun. 7, 2011

(51) Int. Cl.  
*G10L 15/00* (2013.01)

(52) U.S. Cl.  
USPC .................... 704/275; 379/88.02; 379/205.01

(58) Field of Classification Search  
USPC ............................ 704/275; 379/88.02, 205.01  
See application file for complete search history.

(56) References Cited

U.S. PATENT DOCUMENTS

| | | | | |
|---|---|---|---|---|
| 5,483,588 | A * | 1/1996 | Eaton et al. | 379/202.01 |
| 6,633,848 | B1 * | 10/2003 | Johnson et al. | 704/277 |
| 2005/0010407 | A1 * | 1/2005 | Jaroker | 704/235 |
| 2007/0188599 | A1 * | 8/2007 | Kenoyer | 348/14.08 |
| 2011/0032845 | A1 * | 2/2011 | Agapi et al. | 370/260 |

OTHER PUBLICATIONS

U.S. Appl. No. 13/039,065, entitled "System and Method for Managing Conversations for a Meeting Session in a Environment," filed Mar. 2, 2011; Inventor: Tak Ming Francis Pang.

U.S. Appl. No. 13/155,1555, entitled "Virtual Event Forensics," filed Jun. 7, 2011; Inventor: Allan Thomson.

"Cisco EnergyWise Technology," Cisco Systems, 2 pages; [Retrieved and printed May 3, 2011] http://www.cisco.com/en/US/products/ps10195/index.html.

"Description of Working Group," Energy Management (eman), 3 pages; [Retrieved and printed May 3, 2011] http://datatracker.ietf.org/wg/eman/charter/.

Ravinder Singh Taneja, "The Talking Stick Colloquium," [retrieved and printed Mar. 2, 2011]; 8 pages; http://www.sikhchic.com/article-detail.php?id=1204&cat=29.

Veverka, Mark "Patently Important," Jun. 19, 2010; © Dow Jones & Company, Inc.; 3 pages; http://online.barrons.com/article/SB50001424052970203296004575314402596370046.html.

"VLC Media Player," VideoLAN Organization, 2 pages; [Retrieved and printed May 3, 2011] http://www.videolan.org/vlc/.

"VNCast,"ViSLAB, Aug. 21, 2009, 5 pages; http://www.vislab.usyd.edu.au/moinwiki/VNCast.

* cited by examiner

*Primary Examiner* — Daniel D Abebe

(57) ABSTRACT

An example method is provided that may include receiving a first request to join a communication session; receiving voice data from a telephonic device in response to an audio prompt requesting a voice input from a dial-in user; interpreting the voice data to identify a particular name; and presenting the particular name in a graphical user interface associated with the communication session, the presentation of the particular name identifying that the dial-in user has joined the communication session.

20 Claims, 10 Drawing Sheets

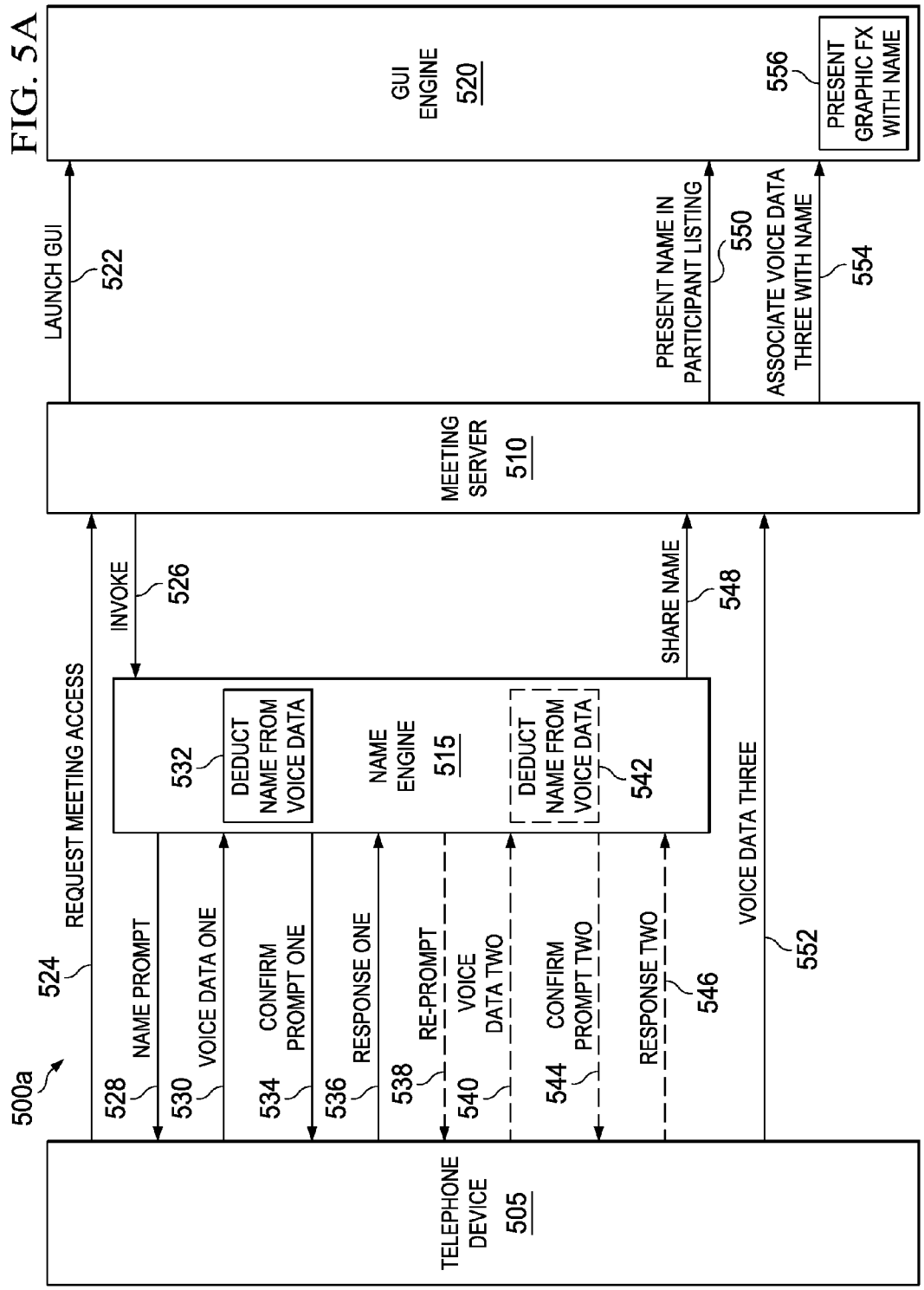

NAME RECOGNITION OF VIRTUAL MEETING PARTICIPANTS

TECHNICAL FIELD

This disclosure relates in general to the field of communications and, more particularly, to name recognition of virtual meeting participants.

BACKGROUND

In certain architectures, service providers and/or enterprises may seek to offer sophisticated online conferencing services for their end users. The conferencing architecture can offer an "in-person" meeting experience over a network. Conferencing architectures can also deliver real-time interactions between people using advanced visual, audio, and multimedia technologies. Virtual meetings and conferences have an appeal because they can be held without the associated travel inconveniences and costs. In addition, virtual meetings can provide a sense of community to participants who are dispersed geographically. Indeed, in certain meeting scenarios, participants can be separated from other participants by several thousand miles and include persons whom one or more of the other participants in the meeting have never met in person or over the phone. Further, in some virtual meeting scenarios, meeting participants may want to identify their participation or presence in the meeting to other participants in the meeting. Meeting participants can be identified by visual and/or audio indicators to assist other participants in identifying who is participating in the virtual meeting.

BRIEF DESCRIPTION OF THE DRAWINGS

FIGS. 5A-5C are simplified schematic diagram of a communication system showing example interactions of elements within the communication system.

Like reference numbers and designations in the various drawings indicate like elements.

DETAILED DESCRIPTION OF EXAMPLE EMBODIMENTS OVERVIEW

Figure 1:
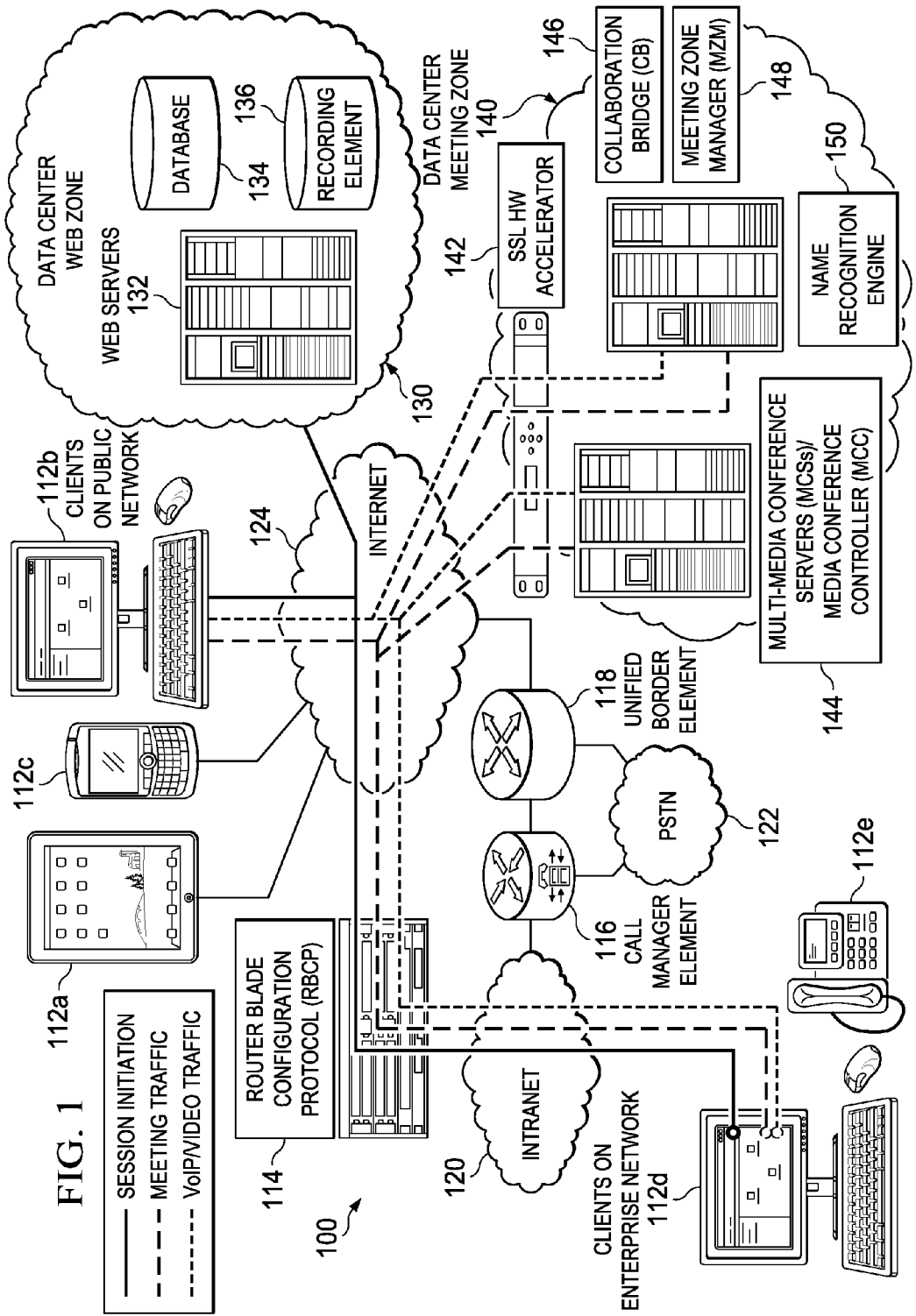
FIG. 1 is a simplified schematic diagram of a communication system for identifying meeting participant names in accordance with one embodiment of the present disclosure.

In general, one aspect of the subject matter described in this specification can be embodied in methods that include the actions of receiving a first request to join a communication session from a dial-in user requesting to join the communication session via a telephonic device. Voice data can be received from the telephonic device in response to an audio prompt requesting a voice input from the dial-in user. The voice data can be interpreted, using at least one processing device, to identify a particular name. The particular name can then be presented in a graphical user interface associated with the communication session, the graphical user interface displayed to other participants in the communication session accessing the communication session using graphical display devices, the presentation of the particular name identifying that the dial-in user has joined the communication session.

In another general aspect of the subject matter described in this specification, a system can include a memory element storing data, a processor operable to execute instructions associated with the stored data, a virtual meeting server, and a name recognition engine. The virtual meeting server can be configured to serve a virtual meeting session over a network to a plurality of communication devices, the virtual meeting session including at least one graphic portion and at least one audio portion and the plurality of communication devices includes at least one graphics-enabled communication device and at least one telephone. The name recognition engine can be configured to receive voice data from a particular user and interpret the voice data to identify a particular name of the particular user. The identified particular user name can be presented in the graphic portion of the virtual meeting session to identify that the particular user has joined the virtual meeting.

These and other embodiments can each optionally include one or more of the following features. The particular name can be presented in a listing of meeting participant names, the listing including a plurality of names corresponding to a plurality of meeting participants identified as participating in the communication session. Interpreting the voice data can include speech recognition of the voice data to identify the particular name as spoken by the dial-in user. The identified particular name can be audibly presented to the dial-in user in response to interpreting the voice data, the presentation of the identified particular name including an audio prompt requesting the dial-in user to confirm that the particular name is the name of the dial-in user. Interpreting the voice data can include performing voice recognition on the voice data to identify a particular voice profile from the voice data, identifying that the particular voice profile substantially matches a particular voice signature of a particular user account in a set of user accounts, each user account in the set of user accounts including a corresponding voice signature, and identifying that the particular name is associated with the particular user account. An invitation list can be identified that is associated with the communication session, the invitation list including a plurality of invitees. One or more user accounts can be identified that are associated with one or more of the plurality of invitees, the set of user accounts including the identified one or more user accounts associated with one or more of the plurality of invitees. Second voice data from the other dial-in user can be received. Voice recognition can be performed on the second voice data to identify a second voice profile from the second voice data. It can be determined that the second voice data does not match any voice signature included in the set of user accounts. The other dial-in user can be prompted to speak a name associated with the other dial-in user and speech recognition can be performed on voice data received from the other dial-in user in response to the prompting of the other dial-in user, to generate a predicted name of the other dial-in user. A telephone number can be identified that it is associated with the telephonic device and the set of user accounts can be identified from a plurality of user accounts based, at least in part, on a comparison of the identified telephone number with telephone data included in the plurality of user accounts.

Further embodiments can each optionally include one or more of the following features. First voice data can be identified, during the communication session, the first voice data received from a first device associated with a first one of the plurality of meeting participants. The first voice data can be audibly presented within the communication session to other meeting participants in the plurality of meeting participants. A first graphical effect associated with a presented listing of a first name in the listing of participant names can be graphically presented in the graphical user interface and during presentation of the first voice data, the graphical effect indicating that the first participant is speaking within the communication session. Second voice data can be identified during the communication session that is received from a second device associated with a second one of the plurality of meeting participants. The second voice data can be audibly presented within the communication session. A second graphical effect associated with a presented listing of a second name in the listing of participant names can be graphically presented in the graphical user interface and during presentation of the second voice data, the second name corresponding to the second participant, and the second graphical effect indicating that the second participant is speaking within the communication session. The communication session can be recorded including the voice data and video data presented during the communication session, the video data corresponding to presentation of the graphical user interface during the communication session and including the first and second graphical effects.

Further, in some embodiments, dial-in users can be presented with an option to opt-out of collecting voice data to interpret the voice data to identify a name associated with the dial-in user. Data can be received from another dial-in user accepting the option to opt-out. In response to the acceptance of the option to opt-out, a substantially generic identifier can be presented, in the graphical user interface, corresponding to the other dial-in user, the substantially generic identifier identifying that the other dial-in user has joined the communication session. The voice data can be first voice data and the dial-in user can be a first dial-in user, where second voice data is received from the telephonic device and determined to correspond to a different, second dial-in user using the telephonic device. The second voice data can be interpreted to identify a second name. The second name can be presented in the graphical user interface. Additional voice data can be received from the telephonic device additional voice data during the communication session. Voice recognition can be performed on the additional voice data to identify that the additional voice data corresponds to speaking by the second dial-in user. The data stored by a memory element can include the set of voice signatures and records corresponding to the plurality of person names. A name recognition engine can be further configured to perform speech recognition on the received voice data to identify the particular name as spoken by the particular user.

Some or all of the features may be computer-implemented methods or further included in respective systems or other devices for performing this described functionality. The details of these and other features, aspects, and implementations of the present disclosure are set forth in the accompanying drawings and the description below. Other features, objects, and advantages of the disclosure will be apparent from the description and drawings, and from the claims.

EXAMPLE EMBODIMENTS

While virtual, virtual meeting and conferencing technologies have made organizing and convening meetings more convenient, context of communication is often lost in communication sessions, including communication sessions within online, virtual communication environments, particular where meeting participants cannot see and observe each of the other participants in the virtual meeting and do not readily recognize the identities of the speakers from their voices. An important aspect of appreciating the proper context of communication within a meeting environment is an understanding of the identity of the person speaking. For instance, two different persons with two unique personalities and backgrounds can generally express identical words or ideas with different meanings or contexts. For example, when a first person who has been advocating for a particular agenda or result expresses support for the result, the significance is much different from a second individual expressing support for the same result where the second individual had previously advocated a second result. If other meeting attendees are unable to recognize the source of the expressed support, the full context is lost. Accordingly, where one or more meeting participants may not be visible or fully identified within a virtual meeting environment, there may be an increased risk of falsely or incorrectly attributing certain verbal communications within a virtual meeting environment. Such a risk can be particularly acute where participants in the virtual meeting are less acquainted with other participants in the meeting and are unable to immediately recognize participants by their voice, as sometimes communicated over lower-quality communication channels.

In some implementations of an improved communication system, features can be provided allowing for the automated identification of virtual meeting participant names from voice data provided by the meeting participants. Identified participant names can be included in graphical data available for display to at least some of the meeting participants. Further, graphical effects can be presented to meeting participants graphically associating voice data, shared in the virtual meeting, with one of the identified meeting participants, allowing the other meeting participants to accurately attribute the voice data (i.e., verbal communications) with the proper identified meeting participant.

Turning to FIG. 1, a simplified block diagram is shown illustrating a communication system 100 for use in generating, managing, hosting, and/or otherwise providing virtual meetings within a network environment. Communication system 100 may include a number of endpoints 112a-e that can achieve suitable network connectivity via various points of attachment. In this particular example, communication system 100 can include an Intranet 120, a public switched telephone network (PSTN) 122, and an Internet 124, which (in this particular example) offers a pathway to a data center web zone 130 and a data center meeting zone 140.

Data center web zone 130 includes a plurality of web servers 132, a database 134, and a recording element 136. Data center web zone 130 can be used to store and collect data generated and transmitted in connection with a virtual online meeting. Further, recording elements 136 can be used to record video, graphic, and/or audio data transmitted and shared within a virtual meeting, allowing a full multi-media transcript or recording to be generated of the virtual meeting for use by other users who may not have been able to attend the meeting or by attendees of the meeting who wish to review the content of the meeting. Further, data center meeting zone 140 includes a secure sockets layer hardware (SSL HW) accelerator 142, a plurality of multimedia conference servers (MCSs)/media conference controller (MCC) 144, a collaboration bridge 146, a meeting zone manager 148, and a name recognition engine 150. Generally, data center meeting zone 140 can include functionality providing, organizing, hosting, and generating virtual meeting services and sessions for consumption by communication device clients. Further, as a general proposition, each MCS can be configured to coordinate video and voice traffic for a given virtual meeting. Additionally, each MCC can be configured to manage the MCS from data center meeting zone 140.

Note that various types of routers and switches can be used to facilitate communications amongst any of the elements of FIG. 1. For example, a call manager element 116 and a unified border element 118 can be provisioned between PSTN 122 and Intranet 120. Also depicted in FIG. 1 are a number of pathways (e.g., shown as solid or broken lines) between the elements for propagating meeting traffic, session initiation, and voice over Internet protocol (VoIP)/video traffic. For instance, a client (e.g., 112*a-e*) can join a virtual online meeting (e.g., launching integrated voice and video). A client (e.g., 112*a*) can be redirected to data center meeting zone 140 and a meeting zone manager 148 can direct the endpoint client (e.g., 112*a*) to connect to a specific collaboration bridge server 146 for joining the upcoming meeting. In instances where the meeting includes VoIP/video streams, then the endpoint client can also connect to a given server (e.g., an MCS 144) to receive those streams. Operationally, there can be two connections established to the collaboration bridge 146 and to the MCS 144. For the collaboration bridge 146, one connection is established to send data and a second connection is established to receive data. For the MCS 144, one connection is established for control and the second connection is established for data. Further, other endpoint clients (e.g., 112*b-e*) also participating in the meeting can similarly connect to the server (MCS 144) to exchange and share audio, graphic, video, and other data with other connected clients.

Before turning to the operational flows and infrastructure of example embodiments of the present disclosure, a brief overview of a communication session, such as a session within a virtual meeting environment, is provided along with basic discussions associated with the identification of participants within a communication session. A communication session can include any session involving two or more communications devices transmitting, exchanging, sharing, or otherwise communicating audio and/or graphical messages, presentations, and other data, within a communications system or network. In some instances, communications devices within a communication session can correspond with other communications devices in the session over one or more network elements, communications servers, and other devices, used in facilitating a communication session between two or more communications devices. As one example, a communication session can include a virtual meeting, hosted, for example, by a meeting server, permitting one or more of the participating communications devices to share and/or consume audio data with other communications devices in the virtual meeting. Additionally, in some instances, the virtual meeting can permit multi-media communications, including the sharing of graphical and audio data. In another example, the communication session can include a two-way or conference telephonic communication session, including telephonic communications involving the sharing of both audio and graphical data, such as during a video chat or other session, via one or more multimedia-enabled smartphone devices.

In some instances of a communication session, such as an example virtual meeting session, participants in a virtual meeting may not be able to see or recognize the voice of the participant who is talking at any particular point in the virtual meeting. This can be particularly the case where participants are separated by geography, organization, nationality, etc. Accordingly, an virtual meeting environment can include a graphical interface that includes a listing of the participants in the virtual meeting, to assist other participants to know who is participating in the meeting or who may be speaking in the meeting. In some implementations, the virtual meeting can include a graphical listing of meeting participants that further includes functionality that graphically attributes speech within the virtual meeting to a particular meeting participant. However, in some implementations, it can be difficult to obtain reliable name data from a particular user, such as users accessing the audio portion of a virtual meeting via a telephone and/or users who participate in the virtual meeting without logging-in to a user account associated with the virtual meeting.

In some instances, a virtual meeting can be accessed via a plurality of different communication devices (e.g., 112*a-e*). An online meeting can include audio, video, screen and desktop sharing, and other multimedia formats. For instance, within a virtual meeting, a user can share the desktop displayed on the user computer's display device via a meeting client installed on the user's communication device while describing the desktop's content verbally over an audio communication channel. In some implementations, it can be advantageous to provide users the ability to access a meeting (and even portions of a meeting) using a variety of different communication devices with varying communication capabilities. For instance, a user can access both the graphical and audio portions of a virtual meeting using a laptop or desktop personal computer including speakers and a graphical display (such as a computer monitor). Further, a personal computer user can contribute desktop images, digital files, video data (e.g., from a local webcam), audio data (e.g., from a microphone connected to the computer), text inputs (e.g., using a keyboard or mouse), among other contributions. On the other hand, organizers of a virtual meeting may not wish to limit participants to those possessing or immediately able to access particular functionality. For instance, a user can still access portions of a multimedia virtual meeting and contribute to the meeting using a simple telephone device possessing only the ability to receive the audio portions of the virtual meeting and contribute voice audio for consumption by the other meeting participants. Unfortunately, telephone participants may be limited in their ability to provide further information and data, including data for use in generating a name identifier for the telephone participant that can be displayed to other participants via a graphical user interface provided in connection with the meeting. While modern telephones can possess text and keystroke functionality, some telephones can be limited in their ability to conveniently transmit such data particularly when the telephone is connected to the audio portion of a virtual meeting or when a user desires hands-free operation.

In accordance with the teachings of the present disclosure, communication system 100 can overcome certain deficiencies (and others) in offering name recognition functionality in connection with a virtual meeting environment and systems adapted to provide, or serve, such meetings. For instance, as shown in FIG. 1, a name recognition engine 150 can be provided in connection with a data center meeting zone 140 or elements of communication system 100 to provide such name recognition functionality in connection with a particular virtual meeting.

Figure 2:
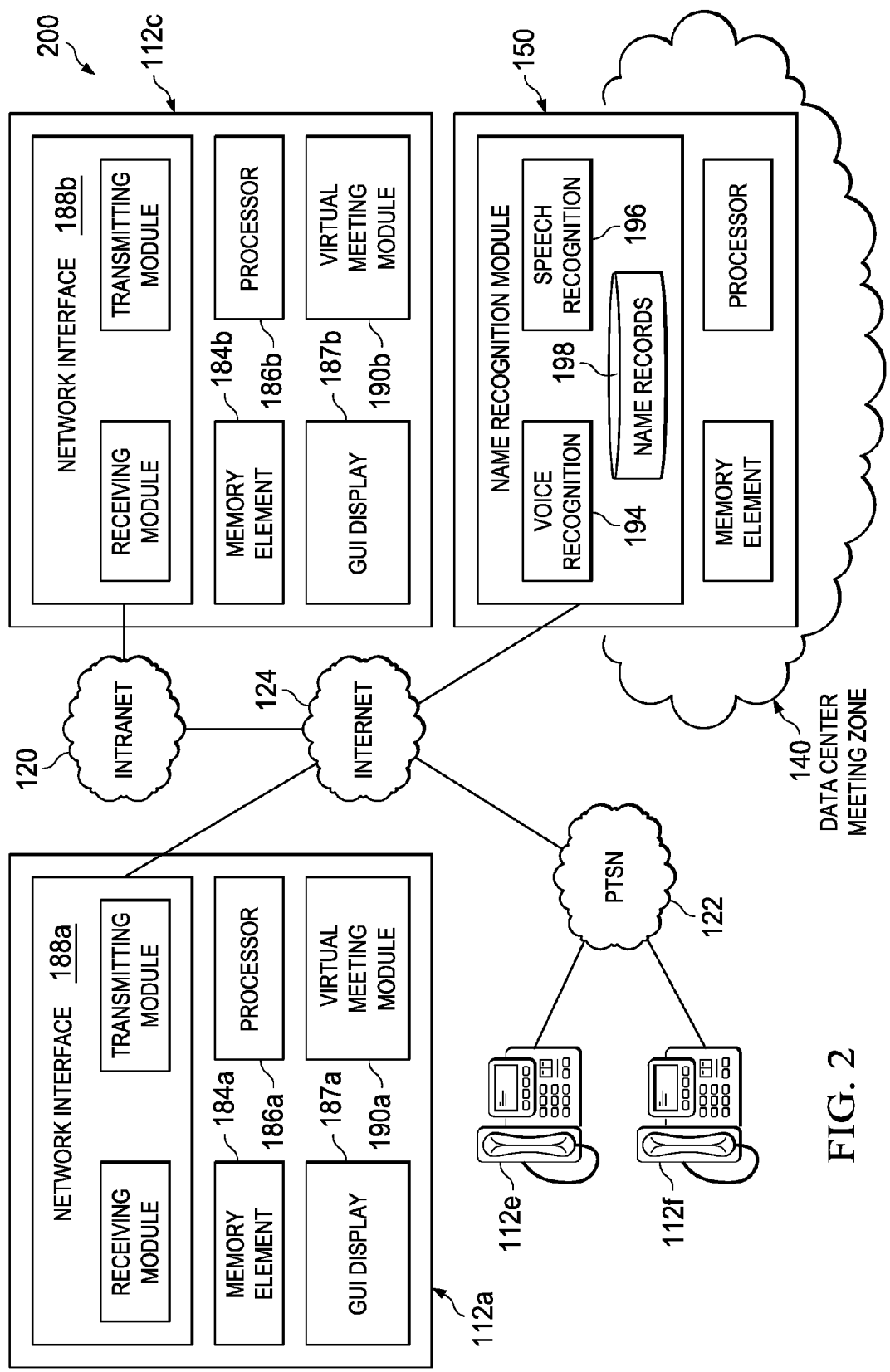
FIG. 2 is a simplified schematic diagram illustrating possible details related to an example infrastructure of the communication system in accordance with one embodiment.

FIG. 2 is a simplified schematic diagram showing one particular example of a selected portion 200 of communication system 100. In this particular example, four communication system endpoints (or communication devices) 112*a*, 112*c*, 112*e*, and 112*f* are shown, each adapted to access virtual meeting services provided, at least in part, by a data center meeting zone 140. For instance, communication devices 112*a-b*, such as personal computing devices, can be provided with one or more memory elements 184*a-b*, processors 186*a-b*, and GUI display devices 187*a-b*. Communication devices 112*a-b* can further include network interfaces 188*a-b* adapted to communicatively couple the devices 112*a-b* to one or more elements of the data center meeting zone 140 over one or more networks (e.g., 120, 122, 124). Communication devices 112*a-b* provisioned with GUI display capabilities can make use of multi-media offerings of a virtual meeting. Further, communication devices 112*a-b* can further include a virtual meeting module 190*a-b*, permitting each of the communication devices 112*a-b* to function as meeting clients in a multi-media meeting environment served using data center meeting zone 140.

As shown in FIG. 2, additional communication devices (e.g., 112*e-f*) can be provided, such as telephonic devices that are primarily adapted to access and contribute audio data of a multi-media virtual meeting served using data center meeting zone 140. In some examples, communication devices 112*a-b* can possess more robust data entry functionality, allowing a user to easily provide participant information to the data center meeting zone 140 for use in the meeting, including the identification of each participant's name within a graphical user interface provided in connection with a meeting via the video portion of the virtual meeting. To assist users of primarily-audio communication devices to provide participant name information, in some implementations, a data center meeting zone 140 can be further provided with a name recognition engine 150. A name recognition engine can include functionality for use in determining a user's name, including a voice recognition module 194 and/or speech recognition module 196, as well as a data store maintained by or accessible to the name recognition engine 150 including name records that can be accessed by the voice name recognition engine 150 in connection with the generation of name predictions made by the name recognition engine 150. In some instances, name records can include associated voice signature data that can be compared against received voice samples to associate the voice sample with a corresponding name record with associated user or account profile information. Further, in some implementations, name records can include a bank of names including speech model data (such as a Hidden Markov model (HMM)) of each name for use in speech recognition of a particular participant name.

Semantically, a virtual meeting can include a web-based client and server virtual meeting application. A client virtual meeting module (e.g., 190*a*, 190*b*) can be loaded onto an end user's endpoint, for instance, over the Internet via one or more webpages. A client virtual meeting module (e.g., 190*a*, 190*b*) can be loaded as a software module (e.g., a plug-in) and downloaded (or suitably updated) before participating in a virtual meeting. If the software module is already resident on the end user's endpoint (e.g., previously downloaded, provisioned through any other type of medium (e.g., compact disk (CD)), then while attempting to participate in a virtual meeting, that software module would be called to run locally on the endpoint. This allows a given endpoint to establish a communication with one or more servers (e.g., provisioned at data center meeting zone 140 (and/or data center web zone 130, as shown in FIG. 1), with the corresponding client (e.g., virtual meeting 190*a*, 190*b*) performing appropriate operations to join a previously scheduled virtual meeting hosted by the data center meeting zone 140.

Static data can be stored in data center web zone 130. For example, the scheduling data, the login information, the branding for a particular company, the schedule of the day's events, etc. can all be provided in data center web zone 130.

Once the meeting has begun, any meeting experience information can be coordinated (and stored) in data center meeting zone 140. Further, For example, if an individual were to share a document then that meeting experience would be managed by data center meeting zone 140. In a particular implementation, data center meeting zone 140 can be configured to coordinate the automated recognition of meeting participant names from voice data received from endpoint devices (e.g., 112*a*, 112*c*, 112*e*, 112*f*) operated by the meeting participants (e.g., via software modules).

Figure 3A:
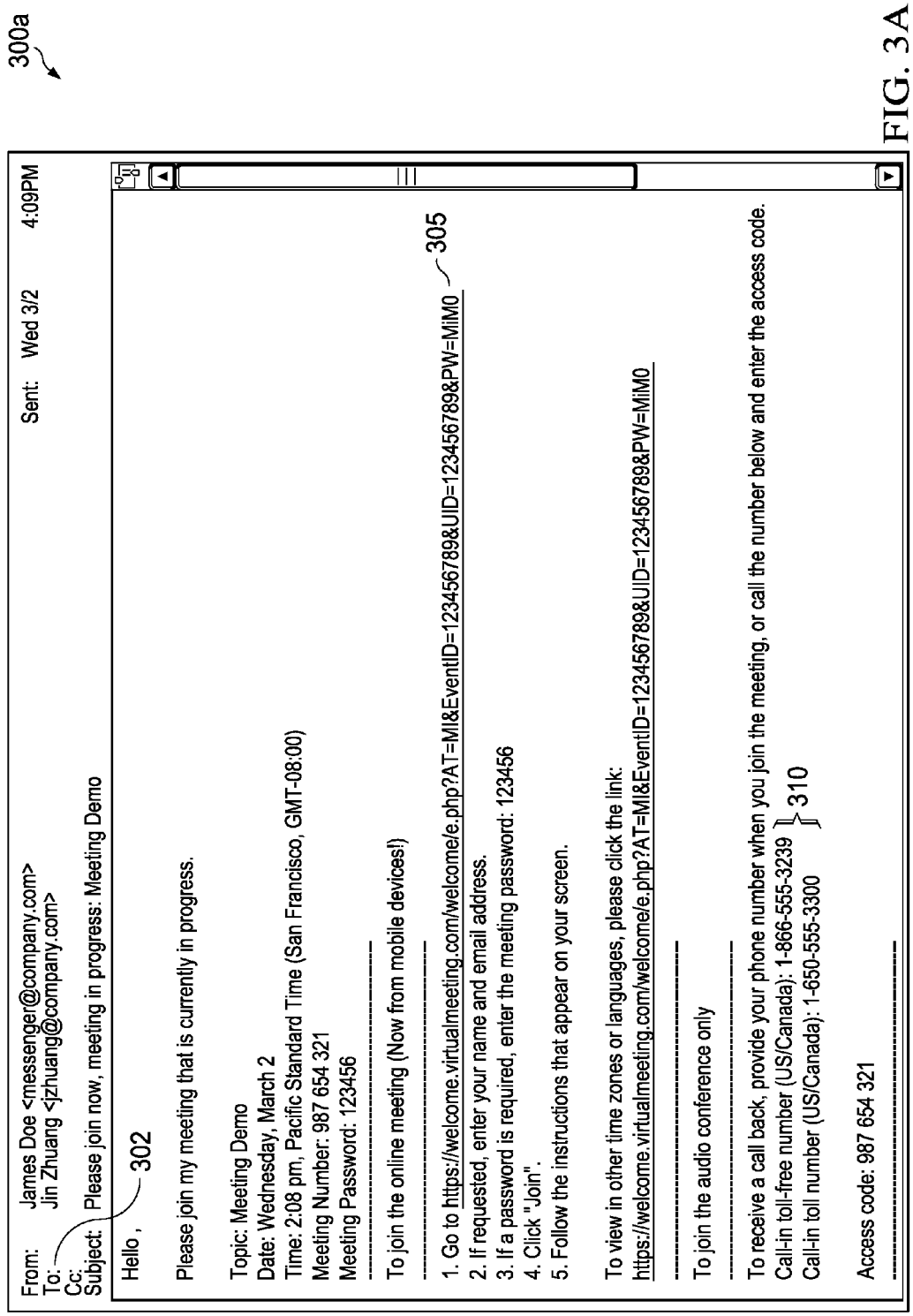
FIGS. 3A-3C are simplified schematic diagrams illustrating example user interface graphics associated with possible implementations of a communication system.
Figure 3B:
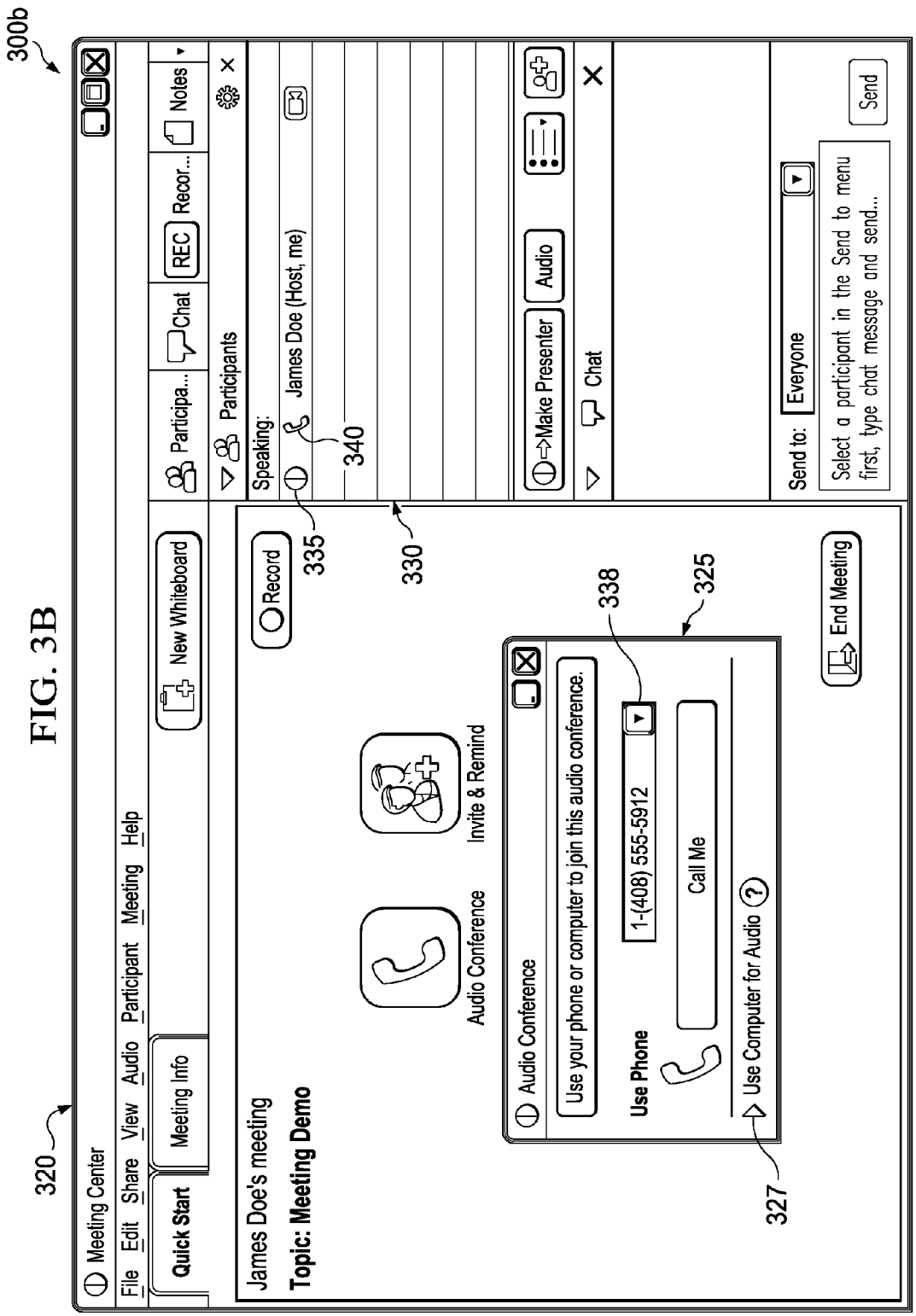
Figure 3C:
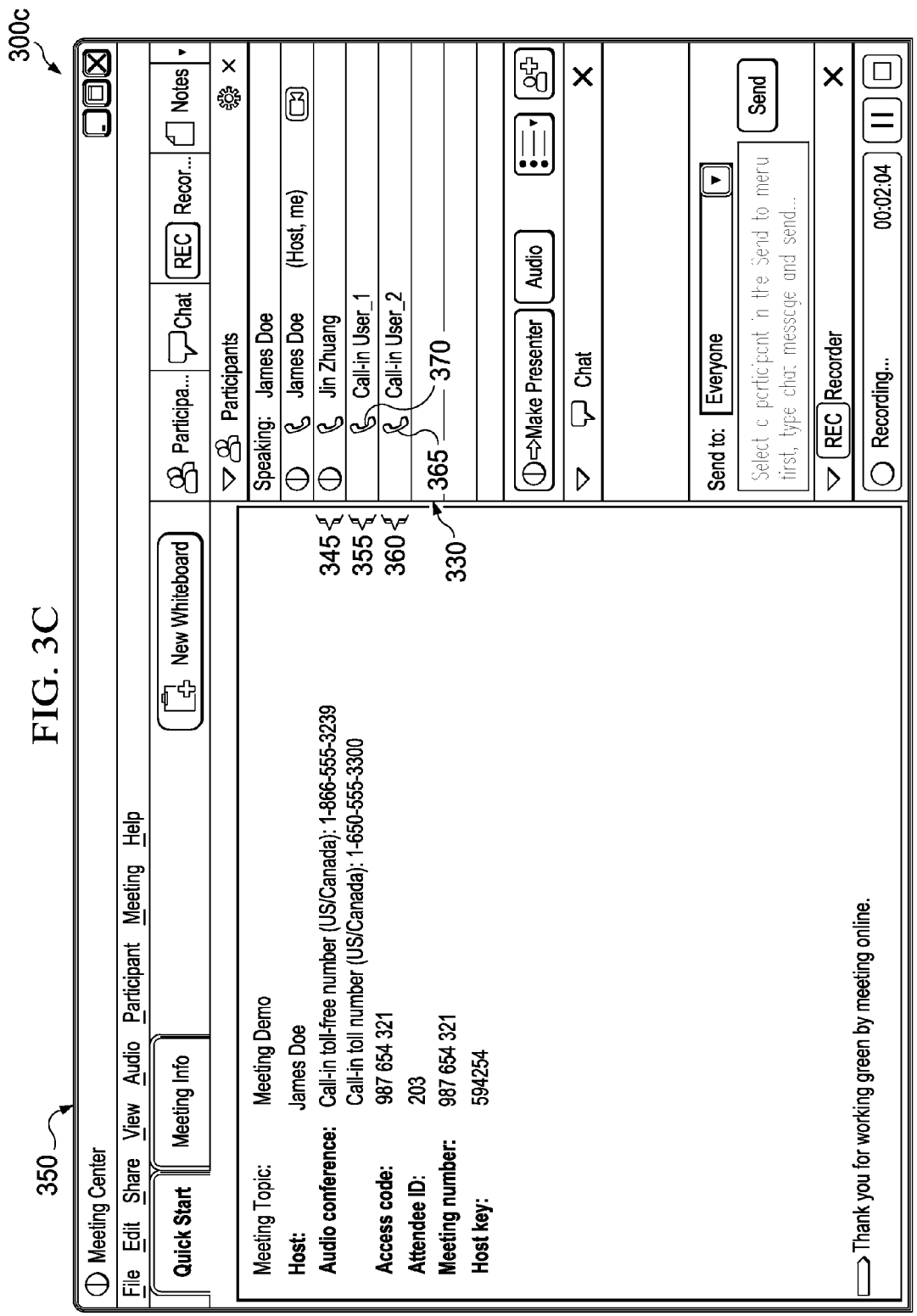

By way of illustration, and in one particular example, a virtual meeting includes four participants, two participants participating by way of personal computing devices 112*a-b* including graphical display capabilities and convenient text entry peripherals, and two other participants participating by way of telephone devices (e.g., 112*e-f*). To illustrate certain simplified features of such an example virtual meeting, FIGS. 3A-3C show certain simplified representations of screenshots 300*a-c* that could be displayed to users in connection with the set-up and consumption of an online virtual meeting. For instance, a host of a meeting can schedule and set-up a virtual meeting using tools and user interfaces of a data center meeting zone 140 or virtual meeting service. The host may have an account with a provider of the virtual meeting service, allowing the host user to import certain preferences, address lists, etc., as well as generate digital invitations to the meeting that can be sent to various other persons and entities. For instance, as shown in FIG. 3A, a digital invitation to a virtual meeting is shown, generated as an email 302 sent to one of the meeting invitees "Jin Zhuang." The invitation can include basic details regarding the time, date, and nature of the meeting, as well as instructions to join the meeting as a participant. In this example, a user can join the meeting by one of at least two ways: first, a user can click on a specially-generated hyperlink (e.g., 305), launching the meeting session. Clicking the hyperlink can also cause meeting client software to be invoked or downloaded to a communication device to allow the communication device to be able to access, display, and consume elements of the virtual meeting. Secondly, a user can access the audio portion of the virtual meeting by dialing-in to a telephone number (e.g., 310) associated with the meeting server. The user can further provide a meeting number (and in some cases, a password or security pin) to gain access to the particular meeting.

In one example, graphically-enabled communication devices (e.g., 112*a-b*) can be used to click on the hyperlink 305, thereby launching meeting client software on the communication device and causing the communication device to join the corresponding meeting session served, for example, by a meeting server device of the data center meeting zone 140. In connection with joining a meeting session via a meeting client, one or more graphical user interfaces of the virtual meeting environment can be presented to a user of a graphics-enabled communication device, prompting the user, for example, to log-in to a virtual meeting account, provide personal data, such as the user's name, title, location, company, etc. In addition to the graphical portion of the virtual meeting environment provisioned via a meeting client and GUI display device, a virtual meeting can further include an audio portion. Depending on the functionality and available peripherals of the communication device, a user may have several for consuming and contributing to the audio portions of the multi-media virtual meeting. For instance, a user could receive and transmit audio data using speakers and microphone of the communication device. In other instances, a user can utilize a stand-alone telephone to receive and transmit the audio portion of the virtual meeting, while using the personal computing device's display device, keyboard, mouse, operating system, file management utilities, software interfaces, etc. to receive and contribute to the virtual meeting's graphical portions.

In FIG. 3B, a user interface of the virtual meeting environment provides a participant with a tool and interface for automatically accessing the audio portions of the meeting with an independent telephone device, while the user consumes the graphical portions on the computing device. For instance, an interactive window 325 can be presented to the user on the user computer's display device, prompting the user for information concerning the user's consumption of audio portions of the meeting. In this particular example, the data center meeting zone 140 can include functionality that allows the user to elect to use a telephone for the audio portions of the meeting by having the meeting server call the user's telephone to initiate the connection between the meeting server and the user's telephone device. For instance, the user can specify the telephone device they would like to use by entering the telephone's number in an input field 338 of the window 325. Alternatively, the user can select icon 327 to elect to use the computer for the audio portion of the virtual meeting. Entering the telephone number in field 338 can prompt the data center meeting zone 140 and/or meeting server to place a call to the specified telephone number, thereby opening a communication channel (e.g., over PTSN and/or IP links) between the telephone device and meeting server. Entering the telephone number can also cause the meeting server to associate the user's meeting client (from which the telephone number was received) with the specified telephone device and/or communication channel with which the meeting server is or will be exchanging audio data. Using this association, the meeting server can identify when audio data is received from the telephone device and associate the incoming audio with the meeting client installed on the computing device, including information associated with the meeting client's installation such as the participant's name, user and account profile data associated with the meeting client, etc.

As shown in FIG. 3B, a user interface 320 of the meeting environment can include a listing 330 of participants who have already been identified and joined the particular virtual meeting. In this example, only a participant named "James Doe" has joined the meeting session. Further, the listing 330, can include icons 335, 340 identifying how the participant has joined the meeting. In this particular example, a first icon 335 identifies that the user is accessing graphical portions of the meeting via a meeting client installed, for example, on a personal computing device (i.e., with graphic display capabilities). Additionally, a second icon 340 can indicate that the user is also accessing (and potentially contributing to) the audio portions of the meeting by telephone. For instance, the user may have elected to have the meeting server initiate a telephone connection with a particular telephone device in response to interactions with a user interface window similar to that (e.g., 325) shown and described in connection with FIG. 3B. Further, as shown for example in FIG. 3C, once the user in the example of FIG. 3B has entered a telephone number of a device for use in participating in the meeting, the user's own data (e.g., 345) can also be included in listing 330, indicating that the user is also connected via a meeting client and a telephone. Further, a name of the user (e.g., "Jin Zhuang") can also be included in the listing 330. For instance, the user could have input the name, during log-in or in response to a prompt, using a keyboard or other input device of the personal computer, or the meeting service may have retrieved the information automatically, for example, from pre-existing user profile data.

Continuing with the example screenshot 300c of user interface window 350 illustrated in FIG. 3C, other users 355, 360 may have also joined the virtual meeting. In this example, as indicated by icons 365, 370, users 355, 360 are only accessing audio portions of the meeting via telephones. For instance, the users may have simply dialed-in to the meeting using a telephone number provided in a meeting invitation (such as corresponded in the email of FIG. 3A). Joining the meeting via a telephone can result in less intelligence being collected from a user in connection with the identification of the user. While some information can be automatically collected from a dial-in user, such as the telephone number of the device calling-in to the meeting server, a telephone user may be constrained (e.g., by circumstances or the functions of the respective phone) in their ability to efficiently and accurately the user's name for identification of the user during the virtual meeting session. As a result, in this particular example, rather than correctly displaying the dial-in users' (355, 365) names, a generic identifier can be used, such as "Dial-In Caller_1."

In some instances, the use of generic identifiers may be satisfactory to some participants, as meeting participants can take care to introduce one another over the audio connections of the meeting session and mentally remember which participant was which "Dial-In Caller." This can be less than ideal however. For instance, some users may misunderstand a participant's name (e.g., where a participant has a foreign name, an unusual name, speaks with an accent, has a bad telephone connection, etc.), incorrectly remember which dial-in caller is which, etc. Further, in meetings with large numbers of participants and potentially numerous dial-in participants, as well as meetings where participants may not be well-acquainted, mentally associating which participant corresponds to which generic identifier can be cumbersome. Further, such informalities and misunderstanding can be propagated in recordings of the virtual meeting, where multiple dial-in users remain potentially un- or mis-identified.

Figure 4A:
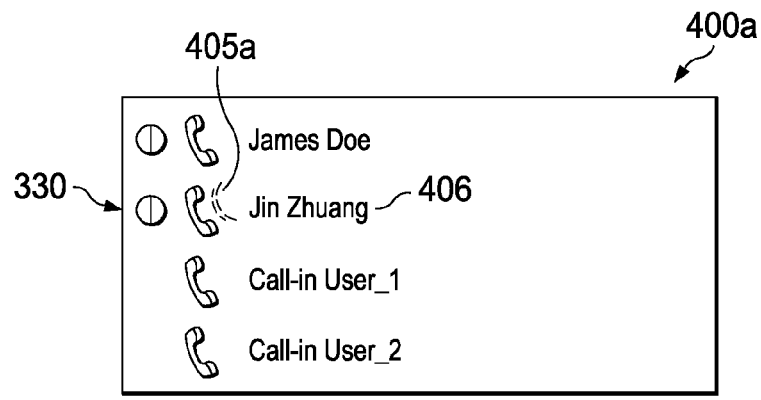
FIGS. 4A-4B are simplified schematic diagrams illustrating example detailed user interface graphics associated with possible implementations of a communication system.
Figure 4B:
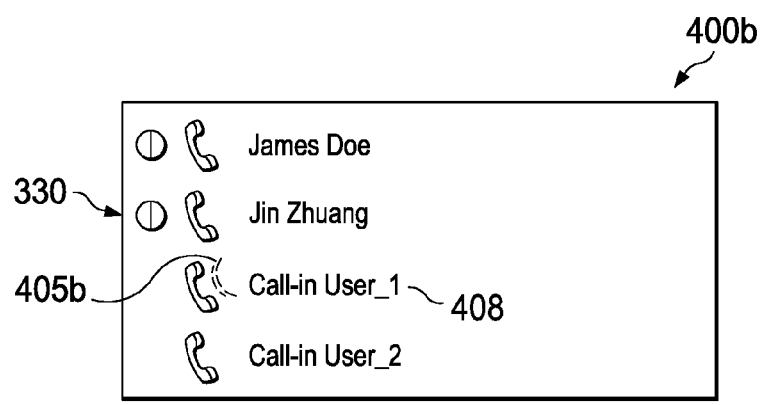

In some implementations of a virtual meeting graphical user interface, the failure to correctly identify participants can undermine certain functionality of a virtual meeting environment. Turning to FIGS. 4A-4B, detailed views 400a, 400b of the name listing 330 of a graphical user interface of a virtual meeting environment are shown. As described above, in some examples, a virtual meeting server can associate a particular communication device connected to the virtual meeting server with a particular participant. Some implementations can leverage this functionality by detecting when voice data is received from a particular telephone or computing device identified as associated with one of the participants named in the listing 330. Further, when voice data is detected, originating from a particular communication device, the virtual meeting server can cause graphical effects 405a, 405b to be displayed in connection with the listing of the corresponding participant to indicate and reinforce, graphically, that the particular participant is speaking. For instance, as shown in FIG. 4A, audio data has been received from a communication device identified as associated with participant Jin Zhuang 406. Accordingly, a graphical effect 405a has been presented in the listing 330 portion of the meeting GUI, illustrating to other participants (capable of viewing the meeting GUI) that Jin Zhuang is speaking.

While FIGS. 4A-4B show an artistic graphical effect 405a, 405b of animated sound waves radiating from a speaker of a telephone icon, potentially limitless alternative graphical effects can be imagined and implemented (e.g., temporarily changing the font of the name listing, highlighting the background of the name listing, providing an alternative graphic or animation, etc.). Providing such graphical queues can be useful, particularly when multiple persons are exchanging information during a meeting session and participants are having difficulty attributing certain comments and ideas to particular other participants. The values of such queues and functionality diminish, however, when the participants are incorrectly or incompletely identified. For instance, as shown in the example of FIG. 4B, audio data has been received from a telephone device associated with a generically-identified "Call-in User_1" 408. Accordingly, a graphical effect 405b is presented in the GUI's name listing 330 indicating that "Call-in User_1" is speaking. However, If other participants are unaware or have forgotten the true identity of "Call-in User_1" participants may falsely attribute the comments to another user, feel the need to interrupt the flow of the meeting to identify the source of the comments, inadvertently offend another participant by not recognizing their identity, etc.

To assist in providing a convenient mechanism for allowing dial-in users in a virtual meeting environment to communicate and note their identity for reference by other participants in the meeting, a name recognition engine can be provided. A name recognition engine can be provided in connection with a virtual meeting server and other functionality of a data center meeting zone, to use audio data, transmitted by a telephone of a dial-in meeting participant, to automatically identify the name of the dial-in meeting participant. As all telephonic devices should be able to transmit voice, the name recognition engine can detect the participant's name independent of the specific functionality of phone (e.g., text entry functionality, smart phone features, etc.), and allow users to communicate their identity "hands-free." Further, upon identifying the name of the dial-in user, the identified name can be associated with the telephonic communication device, allowing voice data received from the device to be attributed to the participant's identity (such as shown and described in the example of FIG. 4A).

Turning now to FIG. 5A, a simplified schematic diagram 500a shows example interactions between a telephonic device 505, virtual meeting server 510, name recognition engine 515, and GUI engine 520 of the virtual meeting server 510. In the example of FIG. 5A, a virtual meeting has already been initiated or launched by the virtual meeting server 510. In accordance with the beginning of a particular virtual meeting session, a graphical data has been generated by the GUI engine 520 in accordance with the launching 522 of a GUI for the meeting session. A user of the telephonic device 505 can request access 524 to the virtual meeting by placing a phone call over a PTSN and/or mobile network that is routed, for example, via an intermediate IP network, to the meeting server 510. In some instances, the request 524 to access the virtual meeting can launch a virtual meeting session and trigger launching 522 of the meeting session GUI.

The meeting server 510 can identify that a user's request originates from a telephonic device 505 and can further identify that it may be appropriate to offer the user the option of entering the user's name via spoken voice commands over the telephonic voice in order to present the user's name in accordance with a graphical listing of meeting participants' name in a graphical portion of the virtual meeting. For example, the meeting server 510 can identify that the user has connected to the meeting server 510 using a particular dial-in number associated with the virtual meeting rather than, for example, accessing the meeting first using a computing device (e.g., selecting a hyperlink associated with the meeting) and having the meeting server initiate the call to the telephonic device, such as shown and described in connection with the examples of FIG. 3B. In other instances, the meeting server 510 can identify that a user is limited in their ability to enter text via the communication devices utilized by the user to access the meeting. For instance, data identifying the type of telephonic device 505 utilized by the user can be communicated to the meeting server. Such data can be collected or transmitted automatically to/from the phone or may be collected in response to a prompt requesting such information from the user. In still other examples, the meeting server can identify characteristics of the user to determine that there may be an opportunity to determine the user's name for inclusion in a meeting GUI. For instance, the meeting server 510 can identify that the user has not logged-in to a user account associated with the virtual meeting or meeting server 510 and deduct that it is likely that the user does not plan on accessing the meeting via a computing device with more robust text and data entry capabilities (i.e., where the user would be more likely to create and/or log-in to such a user account).

In one example, upon identifying that the telephonic device and/or associated user information suggests using voice commands to establish the user/meeting participant's name via voice commands over the telephonic device, the meeting server 510 can invoke 526 a name recognition engine 515. The name recognition engine 515 can be used to send an audio prompt 528 to the telephone device requesting the participant to speak the participant's name. In some examples, the prompt can request that the user speak their first and last names, while in other examples, the prompt can request that the user only speak their first name, for simplicity in determining, confirming, and displaying a name for the user. In response to the prompt 528, audio data, generated at the telephonic device 505, can be received 530 by the name recognition engine 515. The name recognition engine 515 can then process the received voice data 530 to deduct, guess, or otherwise determine 532 a person's name from the voice data. The name recognition engine 515 can utilize any suitable speech recognition process or algorithm to determine a name communicated in the received voice data 530. In other examples, the prompt 528 can request that the user spell their name, letter-by-letter. Accordingly, the name recognition engine 515 can interpret voice data 530 received in response by identifying a series of spoken letters and determining a name 532 (and proper spelling) from the voice data 530.

Upon determining 532 a person name from the received voice data 530, in some instances, the name recognition engine 515 can send the telephonic device 505 a confirmation prompt 534 audibly presenting the person name determined by the name recognition engine 515 along with a request for the user to indicate whether the determined name is correct. The confirmation prompt 534, in some examples, can also include a spelling of the name determined 532 by the name recognition engine 515. Name spelling can be important as the determined name is for display to other meeting participants via a graphical user interface. Additionally, verifying the name recognized by the name recognition engine 515, including spelling, can be useful, particularly with meeting participants who have unique names, foreign accents, foreign names, etc. that might complicate the name recognition engine's 515 ability to accurately identify the participant's name and/or spelling. Indeed, in some examples, the determined name presented to the user in the confirmation prompt 534 can also identify that multiple different spellings of the determined name were identified, and request that user identify which of the spellings is the correct spelling of the user's name. For instance, if the user answered a name prompt 528 with the answer "Elliot," the name recognition engine 515 can identify that the user spoke the name "Elliot" but also identify that Elliot has a number of alternative spellings, including "Eliot," "Eliott," "Elliott," etc. Accordingly, the name recognition engine 515 can further request for the user to, not only identify that the user's name is some version of "Elliot" but also request that the user identify (e.g., via a voice or touch-tone command) the user's spelling from a set of identified alternative spellings of the name "Elliot."

The telephonic device 505 can receive a response 536 to the confirmation prompt 534 and forward the response 536 to the name recognition engine 515. The response 536 can indicate whether the determined name is correct. In instances where the user indicates that the name recognition engine 515 has incorrectly determined the name spoken by the user, the name recognition engine 515 can re-prompt 538 the user to repeat the name spoken, so as to provide the name recognition engine 515 with potentially better voice data 540 for use in re-determining 542 the name spoken by the user. In some instances, in response to a user indicating (at 536) that the name recognition engine 515 failed to correctly determine 532 the user's name, the name recognition engine 515 can attempt to determine 542 the user's name from other voice data 540 using a different technique than the one used by the name recognition engine 515 during the first attempted determination 532 of the user's name. For instance, the name recognition engine 515 can request (e.g., at 528) that the user speak their name in the first attempted recognition of the name (e.g., 532), but then request (e.g., at 538) that the user speak the spelling of the name letter-by-letter in the second attempted recognition of the name (e.g., 542), with the name recognition engine 515 using speech recognition functionality to recognize the individual letters spoken by the user rather than an entire spoken name. As with the previous attempt (e.g., 532-536), the name recognition engine 515 can send a second confirmation prompt 544 to the telephonic device 505 requesting the user to indicate (whether vocally, by touch-tone, etc.) whether the name recognition engine 515 correctly determined 542 the user's name.

If the name recognition engine 515 correctly determines a name for the user from voice data collected and forwarded from the users' telephonic device 505, the name recognition engine 515 can communicate 548 the determined participant name to the meeting server 510 for use within the virtual meeting session. For instance, the meeting server 505 can include the name in record data corresponding to the virtual meeting session, such as an attendance summary generated for the meeting. Further, the meeting server 505 can create an association between the determined name, the telephonic device 505, and data received from the telephonic device during the meeting session. Additionally, identification of the determined user name can be incorporated in recordings or transcripts generated for the meeting. Additionally, the meeting server 510 can provide the determined participant name to the GUI engine 520 to include 550 the determined name in a listing of participant names incorporated in a graphical user interface of the meeting session (e.g., listing 330 of FIGS. 3B, 3C, 4A, 4B). Indeed, as discussed in the examples of FIGS. 4A-4B, the virtual meeting GUI may include features that identify whether a particular meeting participant is speaking, by associating a particular graphical effect with the participant's name based on voice data received from a device associated with the participant (e.g., by the meeting server 510). For example, upon identifying the user's name, associating the name with the telephonic device 505, and including 550 the determined name in a listing of participant names, additional voice data can be received 552 from the telephonic device 505 within the context of the virtual meeting session. The meeting server 510 can associate the data with the participant's determined name, and communicate 554 that such data has been received from the participant. Accordingly, the GUI engine can present 556 graphical effects associated with the participant's displayed name to indicate that voice data 552 is being received by the user of the telephonic device 505 and shared with other participants in the virtual meeting session.

In some instances, a user may elect to join a virtual meeting via a phone (and using only the voice features of the phone) because the user is traveling, out-of-office, or in other circumstances that make using a more robust communication device, such as a tablet computer, laptop, smartphone, desktop computer, etc. unavailable or cumbersome. Further, in some instances, a user may be running late for a proposed virtual meeting served by meeting server 510 and want to enter the meeting as quickly as possible. To accommodate such scenarios, in some implementations, prior to prompting 528 the user for a name for display in a GUI of the meeting session, the name recognition engine 515 can first prompt the user to ask whether the user wishes to make use of the name recognition functionality of the meeting session or whether the user would rather progress immediately to the virtual meeting session (e.g., resulting in the adoption of a generic name identifier for the user, such as "Call-in user_1").

Figure 5B:
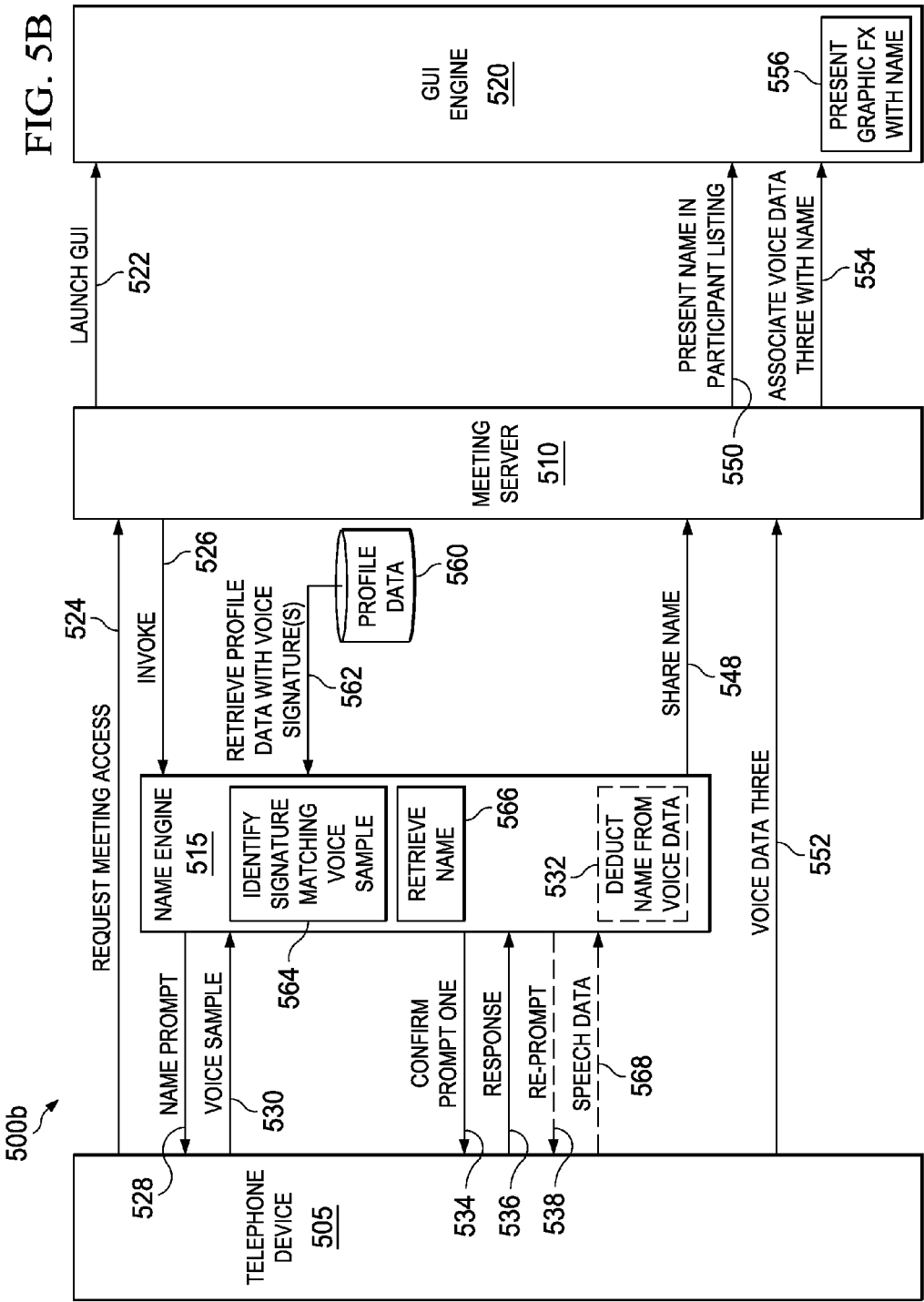

Turning to the example of FIG. 5B, in some implementations, a name recognition engine 515 can include voice recognition functionality for use in connection with stored profile data 560 maintained, for example, in connection with a virtual meeting environment or system. As in the examples of FIG. 5A, a virtual meeting GUI can be launched 522, meeting access requested by a telephonic device 505, and a name recognition engine 515 invoked 526. Additionally, a prompt can be sent 528 to the telephonic device 505 requesting that the user provide voice data in connection with the identification of a name for the user. In the example of FIG. 5B voice data can be received 530 that can include a sampling of the user's voice for comparison against voice signature data included in user profile data 560. The received voice data can be an articulation of the user's name, a particular word or phrase, or other voice sampling. Indeed, in some examples, the voice sample can correspond to a meeting ID, password, or other information for concurrent use within the context of the virtual meeting (e.g., authorization, authentication, etc.).

Continuing with the example of FIG. 5B, in response to receiving 530 voice sample data from the user of telephonic device 505, the name recognition engine 515 can retrieve at least a subset of stored user voice signatures 562 included in the user profile data 560. The voice signatures 562 can be voice signature collected, for example, in connection with users' prior registrations with a virtual meeting system. For instance, a user can register for an account with the provider of virtual meetings and provide information including the user's full name, associated organization, contact information, passwords, username, account subscription information, billing information, etc. Additionally, the user can, in some cases optionally, also provide voice signature data for use within the virtual meeting environment. The voice signature data can be maintained in connection with the remainder of the user's account information. Further, in still other examples, voice signature data can be collected in connection with the user's participation in a previous virtual meeting. For example, a selection of voice data received from the user during a previous virtual meeting session, while the user was logged-in to the user's account, can be collected and stored as a voice signature associated with the user's account.

The name recognition engine 515 can compare the voice sample received 530 in response to the name prompt 528 with previously-collected voice signature data stored and associated with a plurality of users to identify at least one voice signature that adequately matches the received voice sample 530. The name recognition engine 515 can then identify 566 a name (or more than one name in the event that multiple voice signatures were determined to be potential matches to the received voice sample 530) and present the name(s) to the user via a confirmation response. The user can then respond 536 indicating whether, or which of, the presented names is the user's own. In some instances, no matching voice signatures may be identified 564. This would be expected, for example, if the user is a first-time user of the virtual meeting environment or does not have a user account. The failure to identify a matching voice signature can be communicated in the confirmation prompt 534 and cause the name recognition engine 515 to request 538 that the user either provide another voice sample or that the user provide speech data indicating the pronunciation or spelling of the user's name (e.g., as in the examples of FIG. 5A). Indeed, speech data 568 can be received in connection with a failed attempt to match a voice signature to a received voice sample, resulting in speech recognition analysis 532 of the speech data to determine the user's name.

As in the examples of FIG. 5A, upon determining the user's name, the name recognition engine 515 can share 548 the determined name with the meeting server 510, allowing the meeting server to associate the name with data from the telephonic device 505, and communicate the name to the GUI engine 520 for incorporation in a presented meeting participant listing. Further, the receipt of subsequent voice data received 552 from the telephonic device 505 can be communicated 554 to the GUI engine 520, in some examples, to present graphical effects associated with the displayed name to indicate that the user is speaking within a virtual meeting.

In some examples, it can be advantageous to perform voice recognition and speech recognition analysis on a single instance of voice data (e.g., 530) received from a user. For instance, a user can be prompted 528 to speak their name. Additionally, voice signature data can, in some instances, be based on a user's previously recorded pronunciation of their name. As a result, one or both of a voice recognition and speech recognition analysis can be performed on received voice data 530 in an attempt to correctly identify the user's name from a single voice sample. For instance, voice recognition analysis can be performed first on the user's voice sample to determine if matching voice signatures and associated user profile data exist. This can be an effective first approach as it allows, for example, the name recognition engine 515 to also identify the correct spelling of the name based on the previously-entered user profile data. If no matching signatures exist, however, the voice data can still be used to determine the user's name via speech recognition processing of the voice data.

Further, in some implementations, it can be advantageous to limit the subset of voice signatures retrieved 562 and compared against received voice samples 530. For instance, in some example meeting systems, hundreds of thousands of user accounts can be maintained. The time and/or processing resources to repeatedly compare voice samples against all voice signatures in the universe of user accounts could be prohibitively expensive. Accordingly, in some instances, the name recognition engine 515 and/or meeting server 510 can coordinate or query user profile data 560 so as to retrieve 562 a strategically-selected subset of voice signatures identified as being the most likely matches to voice samples received from a particular communication device and/or in connection with a particular meeting session. For instance, the telephone number, area code, or other geographic information can be identified or collected in connection with the telephonic device 505 calling (e.g., 526) and connecting to the meeting server 510. Accordingly, the meeting server 510 can coordinate with the name recognition engine 515 to limit the voice signatures retrieved and compared to only those voice signatures associated with user accounts associated with geographical locations near or otherwise associated with the geographic information collected from the telephonic device 505. For instance, an area code of the telephonic device 505 can be identified by the meeting server 510 and compared against geographical data stored in user profile data 560. Accordingly, a set of user accounts can be identified that include associated telephone, address, or other geographical data included in or near the geographical area associated with the identified area code, with the voice sample compared against voice signatures corresponding to the set of user accounts.

In another example, a previously-scheduled and -organized virtual meeting session can include meeting data that can be used to limit the subset of voice signatures retrieved and compared by the name recognition engine 515. For instance, the meeting information can include a listing of meeting invitees. User accounts and associated voice signatures can be identified for at least a subset of the identified meeting invitees. In further examples, other user accounts can also be identified based on meeting invitees or other meeting information, such as the identification of one or more companies or organizations attending, hosting, or sponsoring the virtual meeting. For instance, user accounts corresponding to one or more identified companies or organizations can be identified, along with associated voice signatures. Other meeting data can also be used to limit the subset of voice signature data used by the name recognition engine 515 to determine 566 a name for a user based on received voice sample data.

Figure 5C:
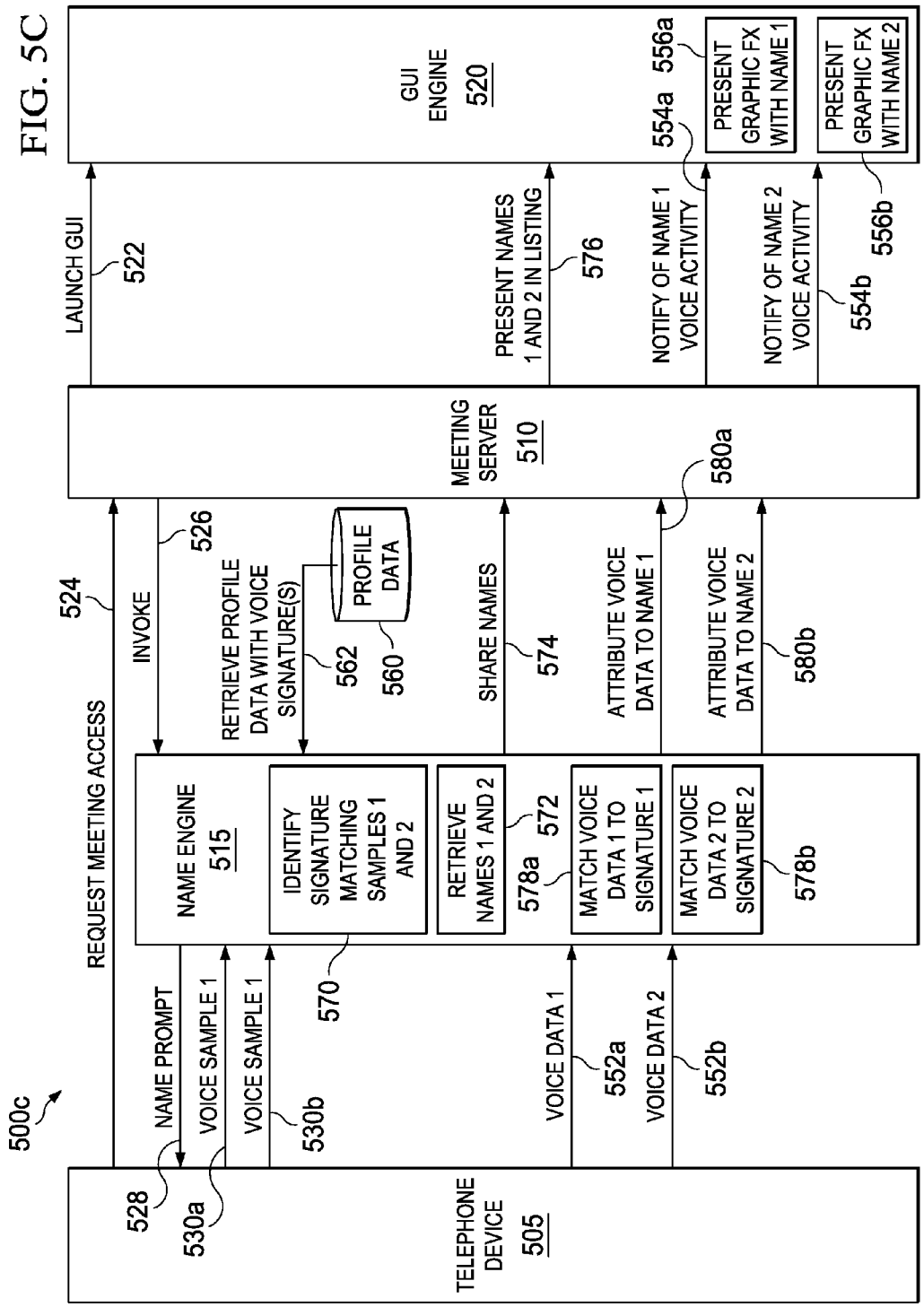

In some instances, multiple users may use a single telephonic device within a virtual meeting session. For instance, a virtual meeting environment may be used within a physical meeting, allowing multiple in-person users to use a conference room telephone to virtually meet and share graphical and audio information with remotely located offices or meeting attendees. In such instances, it may be inadequate to identify data from a particular telephonic device as belonging generally to a particular group of meeting participants (e.g., the conference room attendees). Turning to FIG. 5C, voice recognition features of an example name recognition engine 515 can be leveraged to allow multiple voices (e.g., 530a, 530b) contributing to a virtual meeting via a single phone 505 (e.g., speakerphone) to be identified and attributed (e.g., 556a, 556b) to a particular user identity. For instance, a name prompt 528 can ask whether more than one person is using a particular telephonic device 505 or voice channel within the virtual meeting environment (e.g., where one or more users of the telephonic device 505 are themselves remotely located relative to the telephone 505 and contribute and receive voice data via a second telephonic device (such as via another speakerphone within the conference room). If a user indicates that multiple persons are using accessing the audio portion of a virtual meeting session via a single telephonic device 505, the name recognition engine 515 can individually prompt each distinct user to provide voice sample data (e.g., 530a, 530b) for use, first, in comparing the voice samples against stored voice signatures to identify 570 matching voice signatures and determine 572 names for each distinct user from associated user profile data. Names of participants can also be identified based on speech recognition techniques, similar to those shown and described in the examples of FIG. 5A. Each of the determined names can similarly be included 576 in name listings displayed to attendees via a meeting session GUI.

In the example of multiple users sharing a single telephonic device 505 to access audio portions of a virtual meeting, using voice commands, including voice and speech recognition techniques, can be particularly useful, even in instances where the telephonic device 505 is used in connection with a more robust computing device, including advanced data entry and graphical display capabilities, as multiple users may find it cumbersome to share a single computing or input device. Rather than using, for instance, a single keyboard to enter each of the users' names, the users can each conveniently speak into the telephonic device 505 to identify their names for inclusion in a graphical listing of meeting participants included in a meeting session GUI.

In typical virtual meetings, multiple persons can potentially contribute to a virtual meeting conversation using a single telephonic device 505, making it especially difficult for remote attendees to attribute the source of particular comments. Continuing with the examples of FIG. 5C, voice sample data (e.g., 530a, 530b) received from multiple users of a single telephonic device 505 in connection with the identification of the individual users can be leveraged for use in identifying the individual spoken contributions of the users of the single telephonic device 505. For instance, if a particular voice signature is identified as matching the voice sample of a particular user, this voice signature can be used to subsequently identify when the particular user is speaking within the virtual meeting. Further, in some implementations, even when a user of the shared telephonic device 505 does not have pre-existing, associated user profile data with accompanying voice signatures, the name recognition engine 515 can capture and assign a voice signature to the user, for purposes of the virtual meeting, based on voice sample data received from the user, for instance in response to a prompt (e.g., 528) for the individual user's name. Accordingly, in one example, first voice data can be received 552a from a first user of a shared telephonic device 505. The name recognition engine 515 (or another module in the virtual meeting environment tasked with in-meeting voice recognition analyses) can match the received in-meeting voice data 552a, using voice recognition analysis, with previously-identified voice signature data associated with one of the attendees of the virtual meeting. The in-meeting voice data 552a can then be attributed 580a to one of the previously-identified meeting attendees. Further, the GUI engine 520 can be notified that voice activity has been identified corresponding to a first attendee, allowing the GUI engine to generate 556a graphical effects within the meeting GUI identifying to other attendees that the first attendee is speaking. Further, second in-meeting voice data 552b can also be received 515 and matched against another meeting participant's voice signature (578b) and name (580b). Additionally, the GUI engine 520 can again be notified 554b of the received in-meeting voice data from a second user of the shared telephonic device, the GUI engine 520 generating 556b a graphical effect associated with the second user within the meeting GUI.

Using techniques, functionality, and interactions such as those identified in the examples of FIG. 5A-5C, an example virtual meeting system can attribute verbal contributions of particular virtual meeting participants and communicate these attributions graphically via a virtual meeting GUI. Among other features, uses, and advantages, such attributions can also be captured and memorialized through the recording of a particular virtual meeting. For instance, a video recording of the graphical portion of a virtual meeting (e.g., desktop sharing, participant name listings with graphic effects, etc.) can include a record of which meeting participants were speaking and in what contexts. Further, in some instances, audio portions of a virtual meeting can be used to generate (e.g., using computer speech recognition functionality) a written transcript of the virtual meeting, including attributions of comments within the virtual meeting to particular meeting participants. Such recordings can be shared, for instance, with other interested parties who were unable to attend the virtual meeting.

Figure 6:
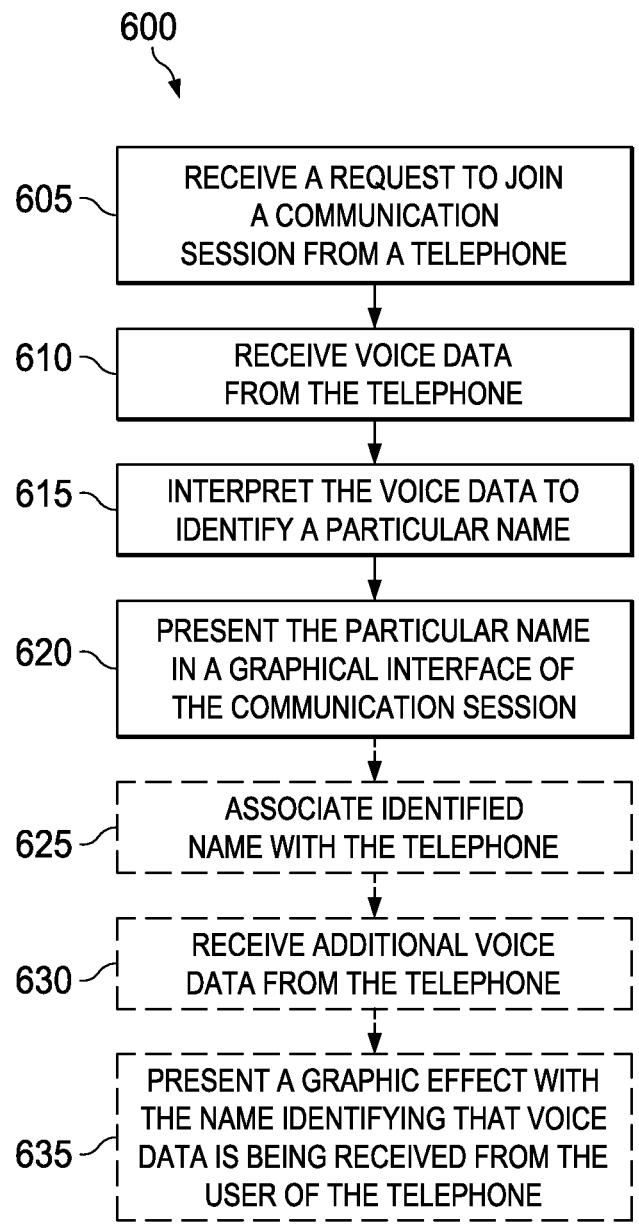
FIG. 6 is a simplified flowchart illustrating an example technique for identifying and presenting virtual meeting participant names in a communication system environment.

Turning to FIG. 6, a simplified flowchart 600 is shown of an example technique for determining the name of a participant of a virtual meeting based on voice data received from the participant. For example, a first request to join a communication session can be received 605 from a dial-in user requesting to join the communication session via a telephonic device. Voice data can be received 610 from the telephonic device, for example, in response to an audio prompt requesting a voice input from the dial-in user. For instance, the voice input can be a voice sample for use in a voice recognition analysis or a pronunciation of a person name for use in a speech recognition analysis. The voice data can be interpreted 615 to identify a particular name. For instance, voice recognition analysis can be performed on the voice data to identify a particular voice profile from the voice data and compare the particular voice profile against a set of voice signatures associated with particular user names and user accounts. In some instances, speech recognition analysis can be performed on the voice data to recognize a particular name spoken by the dial-in user. In either instance, the identified particular name can then be presented 620 in a graphical user interface associated with the communication session. Participants in the communication session accessing the communication session via communication devices equipped with graphical display capabilities can view the graphical user interface to identify, from the presentation of the particular user name, that the corresponding dial-in user has joined the communication session.

Additionally, some optional features can include associating 625 the identified person name with the telephonic device. Additional voice data can be received 630 from the telephone during the communication session and associated with the identified name. Further, a graphic effect can be presented 635 in connection with the presentation of the particular name to identify that the additional voice data is being received from the dial-in user.

It is imperative to note that present Specification and Figures describe and illustrate but one of the multitude of example implementations of a communication system 100. Any of the modules or elements within client endpoints 112a-e and/or meeting servers (e.g., MCSs/MCC 144) data center meeting zone 140, etc. may readily be replaced, substituted, or eliminated based on particular needs. Furthermore, although described with reference to particular scenarios, where a given module (e.g., virtual meeting modules 190a-b, name recognition engine 150, GUI module 520, etc.) is provided within endpoints 112a-e, MCSs/MCC 144, data center meeting zone, etc., any one or more of these elements can be provided externally, or consolidated and/or combined in any suitable fashion. In certain instances, certain elements may be provided in a single proprietary module, device, unit, etc. in order to achieve the teachings of the present disclosure.

Endpoints 112a-e can be representative of any type of client or user wishing to participate in a virtual meeting session in communication system 100 (e.g., or in any other online platform). Furthermore, endpoints 112a-e can be associated with individuals, clients, customers, or end users wishing to participate in a meeting session in communication system 10 via some network. The term 'endpoint' is inclusive of devices used to initiate a communication, such as a computer, a personal digital assistant (PDA), a laptop or electronic notebook, a cellular telephone of any kind, smartphone, tablet computer, or any other device, component, element, or object capable of initiating voice, audio, video, media, or data exchanges within communication system 100. Endpoints 112a-e may also be inclusive of a suitable interface to the human user, such as a microphone, a display, or a keyboard or other terminal equipment. Endpoints 112a-e may also be any device that seeks to initiate a communication on behalf of another entity or element, such as a program, a proprietary conferencing device, a database, or any other component, device, element, or object capable of initiating an exchange within communication system 100. Data, as used herein in this document, refers to any type of numeric, voice, video, media, or script data, or any type of source or object code, or any other suitable information in any appropriate format that may be communicated from one point to another.

MCSs/MCC servers 144, web servers 132, among other servers shown and described, can include network elements that manage (or that cooperate with each other in order to manage) aspects of a meeting session. As used herein in this Specification, the term 'network element' is meant to encompass any type of servers (e.g., a video server, a web server, etc.), routers, switches, gateways, bridges, loadbalancers, firewalls, inline service nodes, proxies, network appliances, processors, modules, or any other suitable device, component, element, or object operable to exchange information in a network environment. This network element may include any suitable hardware, software, components, modules, interfaces, or objects that facilitate the operations thereof. This may be inclusive of appropriate algorithms and communication protocols that allow for the effective exchange (reception and/or transmission) of data or information. In one particular example, MCSs/MCC 144 and web servers 132 are servers that can interact with each other via the networks of FIG. 1.

Intranet 120, PSTN 122, and Internet 124 represent a series of points or nodes of interconnected communication paths for receiving and transmitting packets of information that propagate through communication system 100. These networks may offer connectivity to any of the devices or endpoints illustrated and described in the present Specification. Moreover, Intranet 120, PSTN 122, and Internet 124 offer a communicative interface between sites (and/or participants, rooms, etc.) and may be any local area network (LAN), wireless LAN (WLAN), metropolitan area network (MAN), wide area network (WAN), extranet, Intranet, virtual private network (VPN), virtual LAN (VLAN), or any other appropriate architecture or system that facilitates communications in a network environment.

Intranet 120, PSTN 122, and Internet 124 can support a transmission control protocol (TCP)/IP, or a user datagram protocol (UDP)/IP in particular embodiments of the present disclosure; however, Intranet 120, PSTN 122, and Internet 124 may alternatively implement any other suitable communication protocol for transmitting and receiving data packets within communication system 100. Note also that Intranet 120, PSTN 122, and Internet 124 can accommodate any number of ancillary activities, which can accompany a meeting session. This network connectivity can facilitate all informational exchanges (e.g., notes, virtual whiteboards, PowerPoint presentations, e-mailing, word-processing applications, etc.). Along similar reasoning, Intranet 120, PSTN 122, and Internet 124 can foster all such communications and, further, be replaced by any suitable network components for facilitating the propagation of data between participants in a conferencing session.

It should also be noted that endpoints 112a-e and MCSs/MCC 144 may share (or coordinate) certain processing operations. Using a similar rationale, their respective memory elements may store, maintain, and/or update data in any number of possible manners. Additionally, any of the illustrated memory elements or processors may be removed, or otherwise consolidated such that a single processor and a single memory location is responsible for certain activities associated with talking stick operations. In a general sense, the arrangement depicted, for example in FIG. 2, may be more logical in its representations, whereas a physical architecture may include various permutations/combinations/hybrids of these elements.

Note that in certain example implementations, the name recognition functions outlined herein may be implemented by logic encoded in one or more tangible media (e.g., embedded logic provided in an application specific integrated circuit (ASIC), digital signal processor (DSP) instructions, software (potentially inclusive of object code and source code) to be executed by a processor, or other similar machine, etc.). In some of these instances, a memory element (as shown in FIG. 2) can store data used for the operations described herein. This includes the memory element being able to store software, logic, code, or processor instructions that can be executed to carry out the activities described in this Specification. A processor can execute any type of instructions associated with the data to achieve the operations detailed herein in this Specification. In one example, the processor (as shown in FIG. 2) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

In one example implementation, name recognition engines 150 can include software in order to achieve the name recognition functions outlined herein. These activities can be facilitated, for example, by MCSs/MCC 144 and/or, in some instances, by the various endpoints 112a-f. MCSs/MCC 144 and/or other elements, devices, or systems of data center meeting zone 140 can include memory elements for storing information to be used in achieving the functions of name recognition engine 150, as outlined herein. Additionally, MCSs/MCC 144 and/or other elements, devices, or systems of data center meeting zone 140 can include one or more processors that can execute software or an algorithm to perform the functions of name recognition engine 150, as discussed in this Specification. These devices may further keep information in any suitable memory element (random access memory (RAM), ROM, EPROM, EEPROM, ASIC, etc.), software, hardware, or in any other suitable component, device, element, or object where appropriate and based on particular needs. Any possible memory items (e.g., database, table, cache, etc.) should be construed as being encompassed within the broad term "memory element." Similarly, any of the potential processing elements, modules, and machines described in this Specification should be construed as being encompassed within the broad term "processor."

Note that with the examples provided herein, interaction may be described in terms of a certain number or combination elements. However, this has been done for purposes of clarity and example only. In certain cases, it may be easier to describe one or more of the functionalities of a given set of flows by only referencing a limited number of network elements. It should be appreciated that communication system 100 (and its teachings) are readily scalable and can accommodate a large number of rooms and sites, as well as more complicated/sophisticated arrangements and configurations. Accordingly, the examples provided herein should not limit the scope or inhibit the broad teachings of communication system 100 as potentially applied to a myriad of other architectures.

It is also important to note that the steps discussed with reference to FIGS. 1-6 illustrate only some of the possible scenarios that may be executed by, or within, communication system 100. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings of the present disclosure.

Although the present disclosure has been described in detail with reference to particular embodiments, it should be understood that various other changes, substitutions, and alterations may be made hereto without departing from the spirit and scope of the present disclosure. For example, although the present disclosure has been described as operating in virtual conferencing environments or arrangements, the present disclosure may be used in any communications environment that could benefit from such technology. For example, in certain instances, computers that are coupled to each other in some fashion can utilize the teachings of the present disclosure (e.g., even though participants would be in a face-to-face arrangement). Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A computer-implemented method comprising:
receiving a first request of a dial-in user to join a communication session from a telephonic device;
presenting the dial-in user with an option to opt-out of presenting voice data for use in identifying a name associated with the dial-in user;
if the dial-in user does not opt-out of presenting voice data, receiving voice data from the telephonic device in response to an audio prompt requesting a voice input from the dial-in user;
interpreting the voice data to identify a particular name associated with the dial-in user; and
presenting the particular name in a graphical user interface associated with the communication session, the presentation of the particular name identifying that the dial-in user has joined the communication session.

2. The method of claim 1, wherein the particular name is presented in a listing of meeting participant names, the listing including a plurality of names corresponding to a plurality of meeting participants identified as participating in the communication session.

3. The method of claim 2, further comprising:
identifying first voice data received from a first device associated with a first one of the plurality of meeting participants;
audibly presenting the first voice data within the communication session to other meeting participants in the plurality of meeting participants;
graphically presenting a first graphical effect associated with a presented listing of a first name in the listing of participant names, the first name corresponding to the first participant, wherein the graphical effect indicates that the first participant is speaking within the communication session;
identifying second voice data received from a second device associated with a second one of the plurality of meeting participants;
audibly presenting the second voice data within the communication session;
graphically presenting a second graphical effect associated with a presented listing of a second name in the listing of participant names, the second name corresponding to the second participant, wherein the second graphical effect indicates that the second participant is speaking within the communication session.

4. The method of claim 3, further comprising recording the communication session including voice data and video data presented during the communication session, the video data corresponding to presentation of the graphical user interface during the communication session and including the first and second graphical effects.

5. The method of claim 1, wherein interpreting the voice data includes speech recognition of the voice data to identify the particular name as spoken by the dial-in user.

6. The method of claim 5, further comprising:
audibly presenting the identified particular name to the dial-in user in response to interpreting the voice data, the presentation of the identified particular name including an audio prompt requesting the dial-in user to confirm that the particular name is the name of the dial-in user.

7. The method of claim 1, wherein interpreting the voice data includes:
performing voice recognition on the voice data to identify a particular voice profile from the voice data;
identifying that the particular voice profile substantially matches a particular voice signature of a particular user account in a set of user accounts, each user account in the set of user accounts including a corresponding voice signature; and
identifying that the particular name is associated with the particular user account.

8. The method of claim 7, further comprising:
identifying an invitation list associated with the communication session, the invitation list including a plurality of invitees;
identifying one or more user accounts associated with one or more of the plurality of invitees, wherein the set of user accounts includes the identified one or more user accounts associated with one or more of the plurality of invitees.

9. The method of claim 7, further comprising:
receiving second voice data from a second dial-in user;
performing voice recognition on the second voice data to identify a second voice profile from the second voice data;
determining that the second voice data does not match any voice signature included in the set of user accounts.

10. The method of claim 9, further comprising:
prompting the second dial-in user to speak a name associated with the second dial-in user; and
perform speech recognition on voice data received from the second dial-in user in response to the prompting of the second dial-in user, to generate a predicted name of the second dial-in user.

11. The method of claim 7, further comprising:
identifying a telephone number associated with the telephonic device;
identifying the set of user accounts from a plurality of user accounts, based at least in part on a comparison of the identified telephone number with telephone data included in the plurality of user accounts.

12. The method of claim 1, further comprising:
presenting to a second dial-in user the option to opt-out of presenting voice data for use in identifying a name associated with the second dial-in user;
receiving, from the second dial-in user, data accepting the option to opt-out; and
presenting, in the graphical user interface, a substantially generic identifier as corresponding to the second dial-in user, the substantially generic identifier identifying that the second dial-in user has joined the communication session.

13. The method of claim 1, wherein the voice data is first voice data and the dial-in user is a first dial-in user, the method further comprising:
receiving second voice data from the telephonic device;
determining that the second voice data corresponds to a second dial-in user using the telephonic device, wherein the second dial-in user is a user other than the first dial-in user;
interpreting the second voice data to identify a second name; and
presenting the second name in the graphical user interface.

14. The method of claim 13 further comprising:
receiving from the telephonic device additional voice data during the communication session;
performing voice recognition on the additional voice data to identify that the additional voice data corresponds to speaking by the second dial-in user.

15. A system comprising:
a memory element configured for storing data;
a processor operable to execute instructions associated with the data;
a virtual meeting server configured to facilitate a virtual meeting session over a network to a plurality of communication devices;
a name recognition engine configured to interact with the processor such that the system is configured for:
receiving a first request of a dial-in user to join a communication session from a telephonic device;
presenting to the dial-in user with an option to opt-out of presenting voice data for use in identifying a name associated with the dial-in user;
if the dial-in user does not opt-out of presenting voice data, receiving voice data from the telephonic device in response to an audio prompt requesting a voice input from the dial-in user;
interpreting the voice data to identify a particular name associated with the dial-in user; and
presenting the particular name in a graphical user interface associated with the communication session, the presentation of the particular name identifying that the dial-in user has joined the communication session.

16. The system of claim 15, further comprising a GUI engine configured to:
present a listing of meeting participant names in a graphic portion of the virtual meeting session, the listing of meeting participant names including a plurality of participant names, each participant name corresponding to a respective user of at least one communication; and
present a graphical effect associated with a particular participant name of a particular user of a particular communication device included in the listing in response to voice data being received from the particular communication device.

17. The system of claim 15, wherein the name recognition engine is further configured to:
perform voice recognition on the received voice data to compare the received voice data to a set of voice signatures, each voice signature in the set of voice signatures associated with a respective person name in a plurality of person names; and
associate the received voice data with a particular person name in the plurality of person names based on a determination that the received voice data at least partially matches a particular voice signature in the set of voice signatures associated with the particular person name.

18. The system of claim 17, wherein the data stored by the memory element includes the set of voice signatures and records corresponding to the plurality of person names.

19. The system of claim 15, wherein the name recognition engine is further configured to perform speech recognition on the received voice data to identify the particular name as spoken by a particular user.

20. The system of claim 15, wherein the name recognition engine is further configured for:
presenting to a second dial-in user the option to opt-out of presenting voice data for use in identifying a name associated with the second dial-in user;
receiving, from the second dial-in user, data accepting the option to opt-out;
presenting, in the graphical user interface, a substantially generic identifier as corresponding to the second dial-in user, the substantially generic identifier identifying that the second dial-in user has joined the communication session.

* * * * *